United States Patent [19]

Gable

[11] Patent Number: 5,200,770

[45] Date of Patent: Apr. 6, 1993

[54] BACKGROUND FROM AN ELECTROGRAPHIC PRINTER THROUGH MODULATED OFF STATES

[75] Inventor: Richard J. Gable, Mt. View, Calif.

[73] Assignee: Xerox Corporation, Stamford, Conn.

[21] Appl. No.: 790,791

[22] Filed: Nov. 12, 1991

[51] Int. Cl.⁵ .......................................... G01D 15/06
[52] U.S. Cl. ................................... 346/155; 346/1.1; 346/154
[58] Field of Search .................... 346/154, 155, 1.1

[56] References Cited

U.S. PATENT DOCUMENTS

| | | | |
|---|---|---|---|
| 3,681,775 | 8/1972 | Mason et al. | 346/154 |
| 4,290,076 | 9/1981 | McFarland | 346/154 |
| 4,424,522 | 1/1984 | Lloyd et al. | 346/154 |
| 4,447,821 | 5/1984 | Yuasa et al. | 346/154 |
| 4,697,196 | 9/1987 | Inaba et al. | 346/159 |
| 4,794,412 | 12/1988 | Casey et al. | 346/154 |
| 4,902,111 | 2/1990 | Matsubara et al. | 346/154 X |
| 5,093,676 | 3/1992 | Matsubara et al. | 346/160 |

*Primary Examiner*—Benjamin R. Fuller
*Assistant Examiner*—Randy W. Gibson
*Attorney, Agent, or Firm*—Lisa M. Yamonaco

[57] ABSTRACT

Provided is a system for reducing unwanted background writing effects caused by an elevated OFF voltage state on a print head in an electrographic printing system. This system allows for the OFF voltage to be elevated through the use of modulated OFF states. The OFF voltage is pulsed, or modulated, between a required OFF voltage and a voltage less than the required OFF voltage, during an OFF state, thus reducing erroneous background writing events while maintaining image quality. The system provides a modulated voltage source to be used during the OFF state and an additional constant voltage source to be used during a writing state.

5 Claims, 2 Drawing Sheets

BACKGROUND FROM AN ELECTROGRAPHIC PRINTER THROUGH MODULATED OFF STATES

BACKGROUND OF THE INVENTION

This invention relates to reducing defects caused during electrographic printing, and more particularly to reducing erroneous background writing in an electrographic printing environment.

Electrographic marking, or printing, upon an image recording medium comprises a two-stage process. First, ions are created by electrical breakdown of air in a gap between writing nibs and a recording medium, and ions (usually negative) are conducted to selected image pixel locations to form an electrostatic image on the recording medium. Second, the electrostatic image is made visible by "toning", which usually involves the passing of the recording medium, bearing the non-visible, electrostatic image, into contact with a liquid solution containing positively charged dye particles in colloidal suspension. The dye particles are attracted to the negative charge pattern and the density of the dyed image will be proportional to the potential or charge density on the medium.

Two types of recording media in common usage are paper and film. For paper, the bulk is treated to make it conductive and a dielectric layer of about 0.5 mil thick is coated upon its image bearing side. For film media, a substrate such as Mylar ®, is given a very thin conductive layer and an overcoat dielectric layer upon its image bearing side.

In the electrographic printing process, electrical contact must be made to the conductive layer of the medium in order to charge the dielectric layer with the electrostatic image. In the case of paper, this can be accomplished by direct electrical contact with the backplates of the writing device to the "backside" of the base paper. In the case of film, conductive edge stripes pass through the dielectric layer to the conductive layer providing electrical paths to the conductive layer. Electrical contact is made to the conductive layer through these stripes.

In the process, there must also be a means for establishing the electrical potential difference between the conductive layer and the nibs appropriate for electrical breakdown of the air in the gap. In one type of electrographic writing on paper, the potential of the conductive base is established by pulsing a backplate, which has resistive/capacitive coupling, to the back of the medium (across the medium) in conjunction with activation of writing nibs. The pulsing of a particular backplate in this case addresses several nibs in a group, and the pulsing is to activate that nib group. Pulsing of the backplate is used in what is known in the art as the multiplexed writing method where, during the writing state, the voltage applied to the nib could be −300 volts and the voltage applied to the backplate corresponding to the group including that nib could be pulsed +400 volts therefore providing 700 volts for writing. In the multiplexed writing method, groups of nibs are activated by a common set of drivers, but only those in conjuction with a complementary backplate will write, therefore requiring fewer drivers.

Similarly, the case of using the multiplexed writing method with film, the potential of the conductive layer is also established by pulsing a backplate in conjunction with the activation of the writing nibs, which in this case is only capacitively coupled to the conductive layer through the Mylar ® base. The latter is shown in U.S. Pat. No. 4,424,522 to Lloyd et al., assigned to the same assignee as this application, and hereby incorporated by reference, and further describes multiplexed writing.

Another method of electrographic writing is the non-multiplexed electrographic writing method. In this case, each nib has its own driver and must be addressed individually. When using the non-multiplexed writing method, the potential of the conductive layer is established by grounding or DC biasing the back side of the paper, or the stripe on the film in conjuction with the activation of the nibs. No electrically active backplate is needed. The voltage applied to the conductive layer of the medium via the backplate is the same for all nibs unlike in the multiplexed case where the pulsing of an individual backplate addresses a group of nibs. In the non-multiplexing case, a low voltage such as −225 volts is applied to the nibs while in the OFF state while the blackplate remains at a constant zero volts and no writing is taking place. The voltage on the nibs is then increased when writing is to occur. During writing, the voltage applied to the nib could increase to −700 volts while the voltage applied on the blackplate remains at zero volts again providing 700 volts for writing. As will become apparent, the subject of the present invention can be used with both the non-multiplexed type writing method, where the backplate is held at a constant voltage, and the multiplexed writing method, where a specific backplate addressing a group of nibs is pulsed during writing.

For background purposes, referring to FIG. 1, shown is a model for explanation of the phenomenon occurring in the charging process via electrographic head 20 and recording medium 30. For clarity, only one nib 24 is shown but it can be appreciated that many nibs, positioned in a longitudinally extending array or nibline, are housed in head 20. Nib 24 is formed on substrate 22 and is connected to lead line 23 for supplying charging voltage to nib 24 for writing activation. Air in gap 27 exists between the end of nib 24 and the surface of recording medium 30 in order that the medium surface may be charged, or receive deposited charge. Medium 30 comprises a dielectric layer 32 deposited on a conductive base 34.

During writing, a charging voltage is applied to nib 24 while the conductive layer 34 of medium 30 is held at a DC bias level. Because of the electric field concentrations during charging of nib 24, there is a field emission 29 of electrons at the edges of nib 24. These electrons cause an ionization of air in gap 27. This ionization ignites a glow discharge in discharge region 28, near the central portion of nib 24 surrounded by field emission 29. The portion of gap 27 represented by discharge region 28 becomes ionized and therefore conductive. Discharge region 28 charges up the medium to a voltage where the voltage across the air gap drops to the glow discharge maintenance voltage. When the voltage drop reaches the glow discharge maintenance voltage, discharge region 28 will be extinguished and the charge deposition on the surface of medium 30 will cease.

Typically in an electrographic writing system, when electrographic head 20 is not writing (i.e. in an OFF state), nib 24 is held at a constant voltage below the threshold writing voltage known as an OFF voltage or $V_{OFF}$. This OFF voltage is usually a constant DC voltage which is chosen such that writing does not occur but at a high enough voltage such that future writing will occur within a short time interval. Both the switching speed needed and the amount of writing voltage needed necessitates that the OFF voltage be elevated in the direction of an ON writing voltage rather than at a level which minimizes the field in the air gap. As described above, those nibs then chosen for writing are given an additional voltage, above the OFF voltage, bringing the charge on the writing nibs up to the ON writing voltage level. This ON voltage level brings the nibs to a state guaranteeing air gap breakdown and electrostatic writing.

A problem with having an elevated OFF voltage is the presence of an air gap field which allows charge to accumulate on the recording medium. This excess charge causes the toner to deposit onto the surface of the recording medium, contaminating the image. U.S. Pat. No. 4,290,076 to McFarland, and assigned to a common assigned as this application, addresses this problem and offers a compensation circuit as a solution to remove the excess charge.

Another problem caused by an elevated OFF voltage is present which causes image quality defects. During operation, the print medium comes in direct contact with the nibs. The medium causes an abrasive attack on the nib surface creating metal filaments which act as field amplifiers. The amplified field can often cause charge transfer to occur resulting in random background writing. Use of a less abrasive medium often reduces the amount of background writing but a reduction in abrasiveness lessens the ability of the media to clean the nibs. Lack of the cleaning function for the nibs would cause a greater amount of dropout or image loss. Therefore, changing the abrasiveness of the print medium is not a desirable solution.

Therefore, it would be desirable to reduce the random background writing from the elevated OFF voltage while still maintaining an OFF voltage with a potential high enough to guarantee rapid writing when writing is warranted. Therefore, a system is needed in which the OFF voltage can be elevated to a necessary level while erroneous background writing is reduced without causing dropout or other image quality defects.

SUMMARY OF THE INVENTION

In accordance with the present invention, there is provided a system for reducing unwanted background writing effects caused by an elevated OFF voltage on the nibs in an electrographic printing system. This system allows for the OFF voltage to be elevated through the use of modulated OFF states. The OFF voltage is pulsed, or modulated, during a non-writing time interval, or OFF state, in a range characterized by the maximum being a required elevated OFF voltage necessary to guarantee timely writing, and the minimum being a voltage less than the required OFF voltage. The system provides a modulated voltage source for supplying the OFF voltage to the nibs during an OFF state. Further, the system provides a second constant voltage source to be used during a writing or ON state. During a writing state, the modulated voltage source is connected to the second constant voltage source via a switch and therefore adding their respective voltage values. The increase in voltage due to adding the two voltage sources allows the nibs to write an image onto the recording medium (as in a typical non-multiplexed electrographic recording system). The combination of OFF voltage elevation in cooperation with modulation results in decreased background writing yet has no negative impact on the desired image quality or writing ability.

DETAILED DESCRIPTION OF THE INVENTION

The embodiment used for explanation herein is a non-multiplexed writing configuration where the media conductive layer is at earth ground, while the nib OFF voltage is slightly elevated in the writing direction. Although a non-multiplexed system is disclosed, it is understood that a multiplexed system can also be envisioned where the non-writing state of the nib is biased in opposition to the pulsed backplate.

Figure 1:
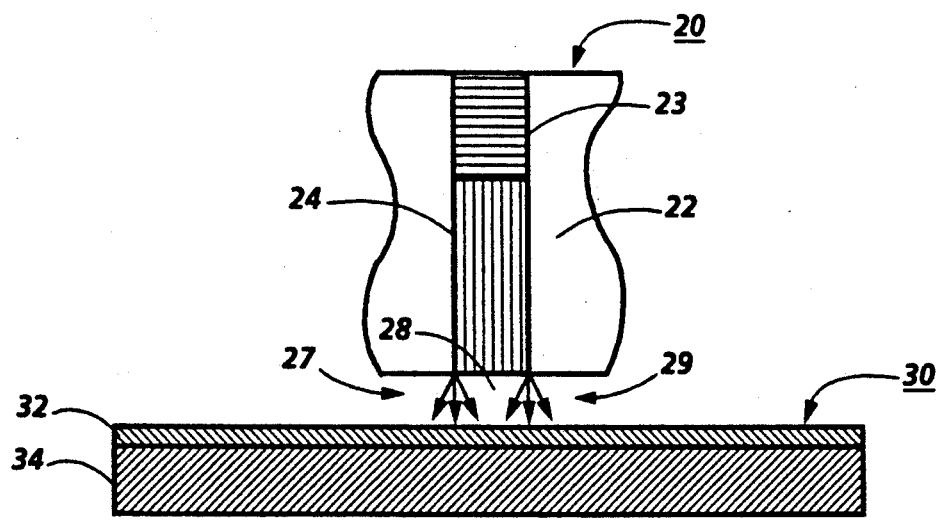
FIG. 1 is an enlarged schematic drawing illustrating the relationship between one writing nib of an electrographic head and the standard recording medium.
Figure 2:
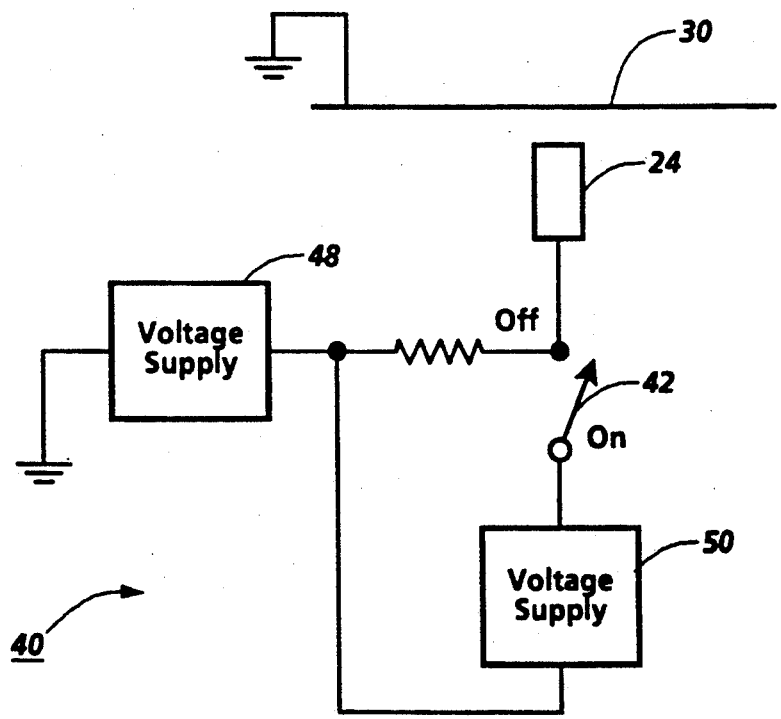
FIG. 2 is a schematic drawing illustrating the electrographic writing system as in FIG. 1 having two voltage supplies controlled by a switch.
Figure 3:
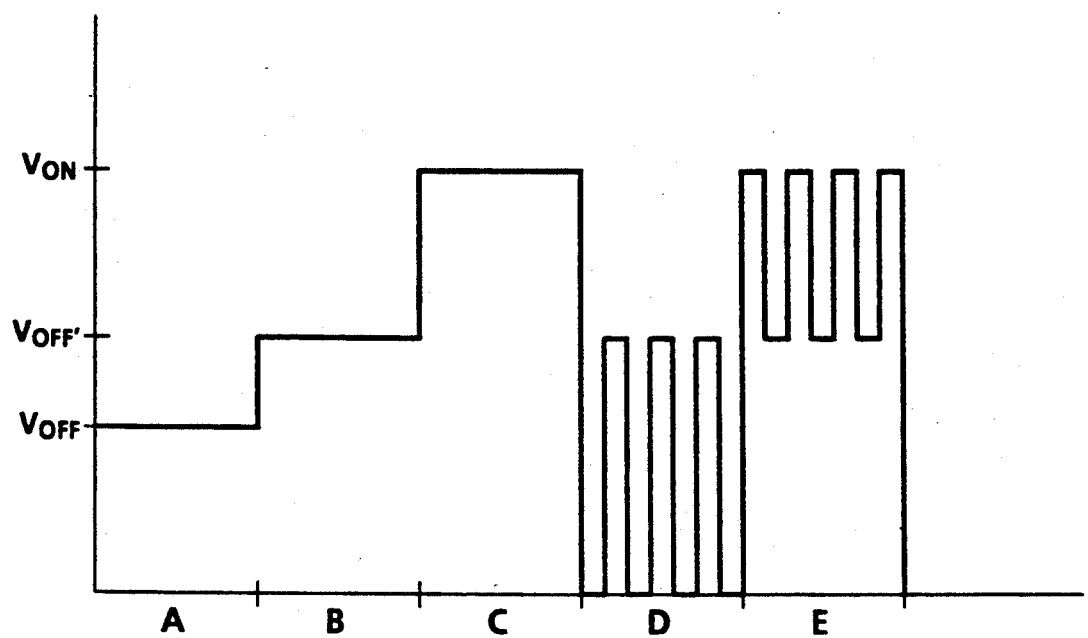
FIG. 3 is a waveform diagram representing various voltage levels which can occur on the imaging nib of FIGS. 1 and 2; and, FIG. 4 is a schematic drawing illustrating another embodiment of the electrographic writing system as in FIG. 1 having two voltage supplies controlled by a switch.

In accordance with the present invention, and referring to FIGS. 2 and 3, there is an electrographic printing system 40 for providing voltage to nib 24. Nib 24 deposits a charge on medium 30 for producing images as described above. Nib 24 is connected to modulated voltage supply 48 when in a non-writing state, or OFF state, with a switch 42 in the open position. During a writing event or ON state, switch 42 closes and elevates writing nib 24 to the sum of voltage from voltage supply 48 plus the voltage supply 50. This addition of voltage, above the OFF voltage, supplies nib 24 with an ON voltage, $V_{ON}$, allowing writing on medium 30. It can be appreciated that the above disclosed system, which has two power sources, the system could be configured to have one power source for supplying only the modulated OFF voltage while the other power source supplies the total ON voltage as shown in FIG. 4.

In configuration as shown in FIG. 2, when switch 42 is in the open position, no writing is to occur on medium 30 and the OFF voltage at nib 24, $V_{OFF}$, is constant as shown during interval A. However, $V_{OFF}$ at interval A may not be at a desired OFF voltage level to guarantee writing within a short time interval, hence the OFF voltage must be elevated. Interval B represents an elevated OFF voltage, $V_{OFF}'$ which brings the OFF voltage to a required level for a rapid transistion to writing. During writing, a constant ON voltage is present at nib 24, $V_{ON}$, as shown in FIG. 3, and is represented in interval C. At interval C, an electrostatic image being written onto mediun 30 by nib 24 due to the increase in voltage, provided by writing voltage supply 50. However, if the voltage $V_{OFF}'$ is an elevated constant as shown in interval B, erroneous backgroung writing occurs on media 30 when no writing is supposed to occur.

To address the problem of erroneous background writing, $V_{OFF}'$ as shown in interval D represents a way of reducing the background writing while maintaining the necessary OFF voltage on nib 24. In this example, the voltage on nib 24 is pulsed between earth ground and $V_{OFF'}$. Switch 42 is in the open position and only voltage supply 48 is supplying nib 24 with a pulsed $V_{OFF'}$ instead of a constant $V_{OFF'}$. Such pulsing has been shown to reduce the erroneous background writing from that of the constant $V_{OFF'}$ shown in interval B. In addition, the pulsing of $V_{OFF'}$ continues to guarantee the next writing event will occur. As shown in interval E, which is depicting a writing event, the pulsed OFF voltage $V_{OFF'}$ of interval D is added to a constant voltage, from supply 50, raising the voltage on nib 24 to a writing level. In system 40, this addition of voltage supplied to nib 24 is accomplished by switch 42 closing causing the voltage from the power supply 48 to be added to the voltage from power supply 50. The addition of these two voltages creates the modulated ON voltage $V_{ON}$ shown in interval E.

Figure 4:
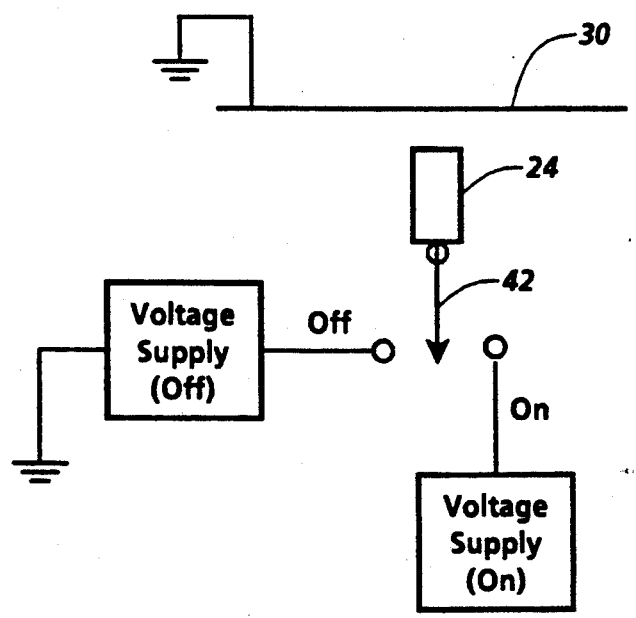

Although a modulated $V_{On}$ in interval E is shown, a non-modulated $V_{ON}$, like that of interval C, will result when using the embodiment of FIG. 4. As shown in FIG. 4, two power sources are used whereby one source supplies a modulated OFF voltage to nib 24 during a non-writing state while the other power source supplies a non-modualated ON voltage to nib 24 during a writing state.

Although a modulated square wave is demonstrated, it can be appreciated that any type of modulation (e.g.. triangle wave, sine wave, etc.) of the OFF voltage from power supply 48 will reduce the inwanted background effect and continue to guarantee the desired rapid writing event through the elevation of the OFF voltage. Such modulation dramatically reduces the frequency of undesired background writing while not negatively effecting the image quality even during a writing state.

Tests have shown that at a constant $V_{OFF'}$ of $-225$ volts, 34 background writing defects occurred for a given plot. When $V_{OFF'}$ was pulsed between $-225$ volts and the ground once every millisecond, the background defects decreased to 6 events for the same given plot. It should also be appreciated that the test results showed a decrease in erroneous background writing events without any degradation of other image quality aspects for the given plot.

While the invention has been described with reference to the structures disclosed, it is not confined to the details set forth, but is intended to cover such modifications or changes as may come within the scope of the following claims:

I claim:

1. An electrographic recording device which writes image data on a recording medium, said device configured to reduce unwanted background writing comprising:

recording means including a series of electrodes arranged in a longitudinally extending array;

a first voltage supply means for supplying a modulated voltage to said electrodes, said modulated voltage having a maximum value below a threshold for writing;

a second voltage supply means for supplying a constant voltage to said electrodes; and a switching means for connecting said electrodes to said first voltage supply means during a non-writing state, supplying said modulated voltage to said electrodes to reduce unwanted background writing during said non-writing state, and for connecting said electrodes to said first voltage supply means and said second voltage supply means during a writing state, resulting in a voltage above said threshold, for writing directly onto said recording medium.

2. An electrographic recording device which writes image data on a recording medium, said device configured to reduce unwanted background writing comprising:

recording means including a series of electrodes arranged in a longitudinally extending array;

a first voltage supply means for supplying a modulated voltage to said electrodes, said modulated voltage having a maximum value below a threshold for writing;

a second voltage supply means for supplying a constant voltage to said electrodes being above said threshold for writing; and a switching means for connecting said electrodes to said first voltaged supply means during a non-writing state, supplying said modulated voltage to said electrodes to reduce unwanted background writing during said non-writing state, and for connecting said electrodes to said second voltage supply means during a writing state resulting in a voltage on said electrodes which is above said threshold, for writing directly onto said recording medium.

3. A method for reducing unwanted background writing from an electrographic recording device during non-writing state, said recording device having electrodes for writing an image onto a recording medium during a writing state, said electrodes requiring a predetermined ON voltage level during said writing state, said electrodes having a maximum OFF voltage level during said non-writing state, said maximum OFF voltage level being below a threshold for writing, include the step of:

modulating said OFF voltage level on said electrodes between said maximum value, and a voltage less than said maximum value, wherein modulating said OFF voltage on said electrodes results in a reduction of unwanted background writing during said non-writing state.

4. A method according to claim 3 wherein said voltage is modulated between said maximum non-writing voltage level and earth ground.

5. A method according to claim 4 wherein said modulation cycle is one millisecond.

* * * * *